US007747041B2

(12) United States Patent
Saito et al.

(10) Patent No.: US 7,747,041 B2
(45) Date of Patent: Jun. 29, 2010

(54) AUTOMATED ESTIMATION OF AVERAGE STOPPED DELAY AT SIGNALIZED INTERSECTIONS

(75) Inventors: Mitsuru Saito, Provo, UT (US); William R. Hereth, Jr., Columbus, OH (US); Alan Zundel, Orem, UT (US)

(73) Assignee: Brigham Young University, Provo, UT (US)

( * ) Notice: Subject to any disclaimer, the term of this patent is extended or adjusted under 35 U.S.C. 154(b) by 996 days.

(21) Appl. No.: 10/948,104

(22) Filed: Sep. 23, 2004

(65) Prior Publication Data

US 2005/0105773 A1 May 19, 2005

Related U.S. Application Data

(60) Provisional application No. 60/505,666, filed on Sep. 24, 2003.

(51) Int. Cl.
*G06K 9/00* (2006.01)
*G08G 1/017* (2006.01)
*G06F 19/00* (2006.01)
*H04N 7/00* (2006.01)

(52) U.S. Cl. ....................... 382/104; 382/103; 382/107; 340/937; 348/149; 701/118; 701/119

(58) Field of Classification Search ................. 382/103, 382/104, 107; 340/937; 348/148, 149; 701/117, 701/118, 119
See application file for complete search history.

(56) References Cited

U.S. PATENT DOCUMENTS 3,920,967 A * 11/1975 Martin et al. ............... 701/118
4,370,718 A * 1/1983 Chasek ....................... 701/117
4,839,648 A * 6/1989 Beucher et al. ............. 340/933
4,847,772 A * 7/1989 Michalopoulos et al. .... 701/117
5,161,107 A * 11/1992 Mayeaux et al. ............ 701/117
5,281,964 A * 1/1994 Iida et al. .................... 340/933
5,296,852 A * 3/1994 Rathi ......................... 340/933
5,301,239 A * 4/1994 Toyama et al. .............. 382/104
5,313,295 A * 5/1994 Taniguchi et al. ........... 348/149

(Continued)

OTHER PUBLICATIONS

Saito, M.; Walker, J.; Zundel, A., Use Of Image Analysis To Estimate Average Stopped Delays Per Vehicle At Signalized Intersections, 2001, Transportation Research Board, Transportation Research Record No. 1776, pp. 106-113.*

(Continued)

*Primary Examiner*—Matthew C Bella
*Assistant Examiner*—Anthony Mackowey
(74) *Attorney, Agent, or Firm*—Austin Rapp & Hardman

(57) ABSTRACT

A system and method for automated estimation of average stopped delay at signalized intersections using digitized still image analysis of actual traffic flow is disclosed. The system and method includes digitizing images of an intersection and creating a line of pixels that acts as a virtual sensor in a traffic lane of interest. Background intensities of the pixel line on the traffic lane without vehicles are compared to pixel intensities on images with traffic. Once vehicles are identified, the present method and system provides for three alternative embodiments of methods for determining the stopped delay for an entire image or for a particular vehicle. Once the stopped delay for all relevant images or for all relevant vehicles is determined, the average stopped delay per vehicle is estimated.

30 Claims, 9 Drawing Sheets

U.S. PATENT DOCUMENTS

| | | | | | |
|---|---|---|---|---|---|
| 5,396,283 | A | * | 3/1995 | Taniguchi et al. | 348/149 |
| 5,402,118 | A | * | 3/1995 | Aoki | 340/937 |
| 5,434,927 | A | * | 7/1995 | Brady et al. | 382/104 |
| 5,467,402 | A | * | 11/1995 | Okuyama et al. | 382/104 |
| 5,467,634 | A | * | 11/1995 | Brady et al. | 73/1.79 |
| 5,509,082 | A | * | 4/1996 | Toyama et al. | 382/104 |
| 5,590,217 | A | * | 12/1996 | Toyama | 382/104 |
| 5,684,898 | A | * | 11/1997 | Brady et al. | 382/282 |
| 5,751,211 | A | * | 5/1998 | Shirai et al. | 340/435 |
| 5,761,326 | A | * | 6/1998 | Brady et al. | 382/103 |
| 5,771,485 | A | * | 6/1998 | Echigo | 701/119 |
| 5,774,569 | A | * | 6/1998 | Waldenmaier | 382/100 |
| 5,777,564 | A | * | 7/1998 | Jones | 340/917 |
| 5,809,161 | A | * | 9/1998 | Auty et al. | 382/104 |
| 5,912,634 | A | * | 6/1999 | Bunnen et al. | 340/937 |
| 5,999,635 | A | * | 12/1999 | Higashikubo et al. | 382/104 |
| 6,044,166 | A | * | 3/2000 | Bassman et al. | 382/103 |
| 6,141,435 | A | * | 10/2000 | Naoi et al. | 382/104 |
| 6,188,778 | B1 | | 2/2001 | Higashikubo et al. | |
| 6,434,254 | B1 | * | 8/2002 | Wixson | 382/103 |
| 6,662,141 | B2 | * | 12/2003 | Kaub | 702/181 |
| 6,760,061 | B1 | * | 7/2004 | Glier et al. | 348/149 |
| 7,170,548 | B2 | * | 1/2007 | Ishikawa | 348/148 |
| 2002/0126875 | A1 | * | 9/2002 | Naoi et al. | 382/104 |
| 2002/0196341 | A1 | * | 12/2002 | Kamijo et al. | 348/149 |
| 2003/0190058 | A1 | * | 10/2003 | Jun et al. | 382/104 |
| 2005/0008194 | A1 | * | 1/2005 | Sakuma et al. | 382/104 |
| 2006/0274917 | A1 | * | 12/2006 | Ng et al. | 382/103 |

OTHER PUBLICATIONS

Webster's II New Riverside University Dictionary, 1994, Houghton Mifflin Company.*

Hsieh, HS; Ting, KL; Wang, RM, "An Image Processing System for Signalized Intersections", Jul. 30-Aug. 2, 1995, IEEE, Vehicle Navigation and Information Systems Conference, 1995. Proceedings. In conjunction with the Pacific Rim TransTech Conference. 6th International VNIS. 'Ride into the Future', pp. 28-34.*

"Real-Time Delay Measurement and Intersection Analysis System", Benekohal et al., Microcomputers in Transportation, American Association of Civil Engineers, New York, Jul. 22-24, 1992, pp. 285-296.

"A Real-Time Computer Vision System for Vehicle Tracking and Traffic Surveillance", Coifman et al., Transportation Research, Part C: Emerging Technologies, vol. 6, No. 4, Aug. 1998, pp. 271-288.

"Automatic Vehicle Recognition", Houghton et al., Proceedings of Second International Conference on Road Traffic Monitoring, 1989, pp. 71-78.

"Real-Time Vehicle Recognition Using Local Feature Extraction", Hwang et al., Electronics Letters, vol. 37, No. 7, Mar. 2001, pp. 424-425.

"Queue Detection and Congestion Monitoring Using Image Processing", Rourke et al., Traffic Engineering and Control, vol. 32, No. 9, Sep. 1991, pp. 412-421.

"Traffic Parameters Detection Based on Video Virtual-Loop Technologies", Yin et al., Proceedings of the Seventh International Conference on Applications of Advanced Technology in Transportation, 2002, pp. 885-893.

* cited by examiner

AUTOMATED ESTIMATION OF AVERAGE STOPPED DELAY AT SIGNALIZED INTERSECTIONS

RELATED APPLICATIONS

This application claims the benefit of U.S. Provisional Patent Application Ser. No. 60/505,666, filed Sep. 24, 2003 and entitled AUTOMATED ESTIMATION OF AVERAGE STOPPED DELAY AT SIGNALIZED INTERSECTIONS USING DIGITIZED STILL IMAGE ANALYSIS OF ACTUAL TRAFFIC FLOW, which is incorporated herein by reference.

TECHNICAL FIELD

The present invention relates generally to the monitoring of vehicular traffic. More specifically, the present invention relates to systems and methods for providing automated estimation of average stopped delay at signalized intersections.

BACKGROUND

With ever increasing road traffic levels there is a particular need to evaluate the performance of traffic control systems. One particular traffic control system that is almost universally encountered is signalized intersections. Evaluation of signalized intersection performance may take various forms. One form of particular importance includes the analysis of average stopped delay per vehicle. The Institute of Transportation Engineers ("ITE") defines stopped delay as the time a vehicle is standing still while waiting in line in the approach to an intersection. The average stopped delay per vehicle for a given intersection approach is the sum of the individual stopped delay divided by the volume of traffic that passes through the intersection approach including vehicles that do not stop.

A basic method for estimating average stopped delay per vehicle suggested by the ITE includes the use of a human observer for counting vehicles. Typically, for fifteen minutes the observer counts the number of vehicles stopped at an intersection approach at fifteen second intervals. The total number of vehicles that passed through the intersection is also recorded. Once the data are collected, the total number of vehicles that were counted as stopped is multiplied by the fifteen second time increment and then divided by the total number of vehicles that passed through the intersection from that approach. This method may be referred to as the ITE manual method.

Although the ITE manual method is common in the field of traffic engineering, it does have several possible error sources. For example, the ITE manual method assumes that vehicles counted as stopped at each fifteen-second interval have been stopped at the intersection for the entire fifteen seconds. Error can also arise from the use of human observers. Long traffic queues can make it difficult for observers to accurately count the stopped vehicles. The difficulties associated with manual analysis do not disappear even if an electronic counter is used to simplify the steps of the ITE manual method.

Consequently, it would be desirable to reduce the large labor cost and reduce the inaccuracies inherent in the ITE manual method. It would further be desirable to provide automated, instead of manual estimation of the average stopped delay per vehicle at a given signalized intersection.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

DETAILED DESCRIPTION

Figure 1:
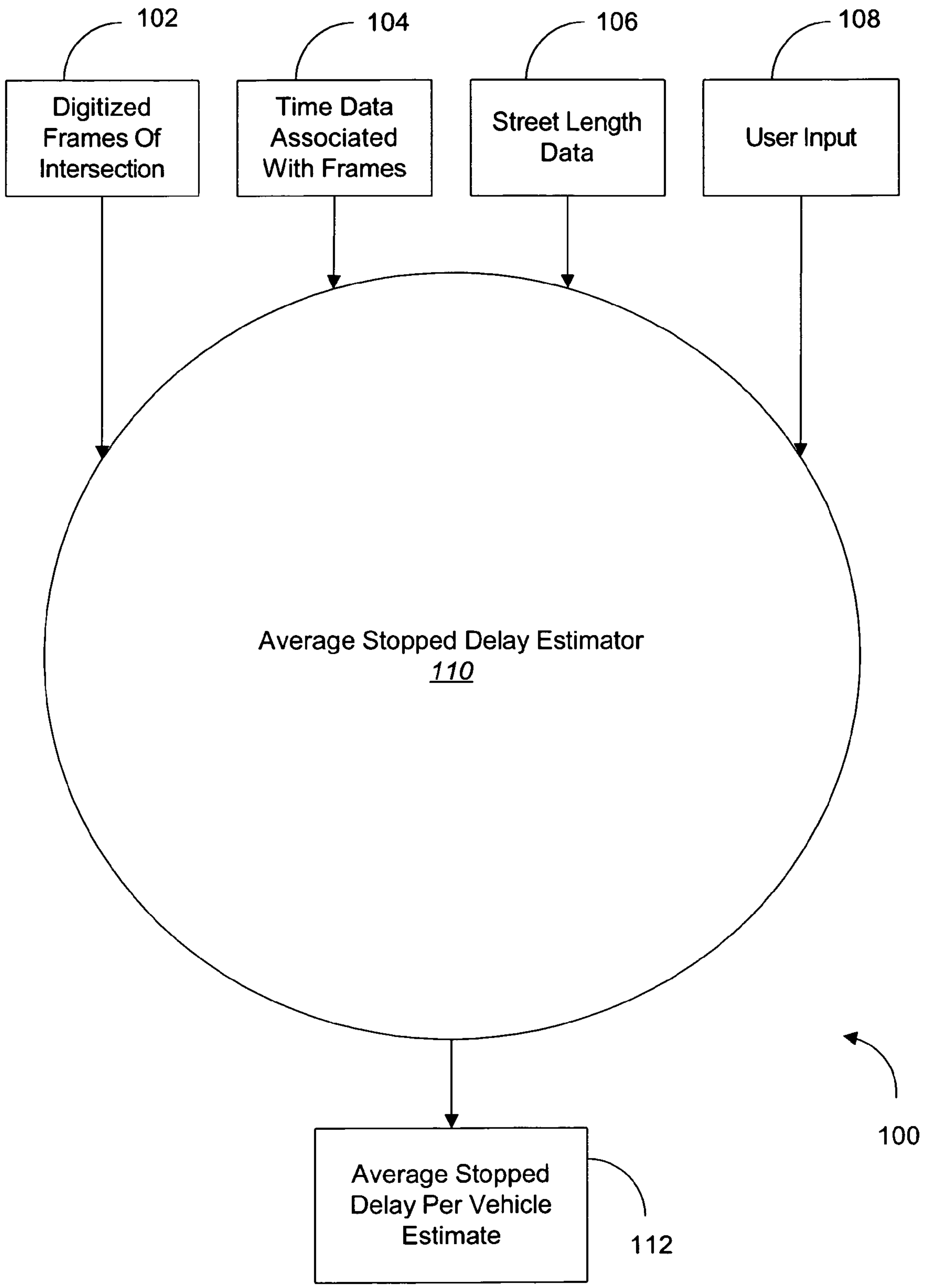
FIG. 1 is a block diagram illustrating a system for estimating the average stopped delay per vehicle at a signalized intersection.

A method for estimating the average stopped delay per vehicle at signalized intersections is disclosed. In the method, a background is created by initializing the background intensities of a line of pixels in a digital image of an actual traffic lane absent vehicles. The process of initializing the background intensities of the line of pixels includes digitizing an image of an actual traffic lane without vehicles. A line of pixels that extends upstream into the traffic lane is then established. Each pixel in the line of pixels is assigned a length value. The intensities of each pixel are then read and stored.

Once the background is initialized, the identity and location of vehicles are identified by measuring the intensities of the line of pixels in a different digital image of the same traffic lane having vehicles. The difference between pixel intensities on the background and the image with vehicles is then calculated. A vehicle is located along the line of pixels by identifying a group of consecutive pixels where the difference between pixel intensities is outside of a specified threshold.

The stopped delay for each vehicle or for each digital image is then calculated. This may be accomplished by different methods. One method for calculating the stopped delay for each digital image includes calculating the distance between vehicles identified on the digital image. If the distance between vehicles is below a specified gap distance, it is determined that the vehicle is stopped. The total number of vehicles stopped on the digital image is then added together and multiplied by the time interval between each digital image.

If the length of one of the vehicles is greater than a specified maximum length, the long vehicle is divided into multiple vehicles which are considered stopped. The long vehicle is divided up based upon a specified average vehicle length. Alternatively, if it is determined that the vehicle is greater than the specified maximum length, the number and lengths of vehicles in substantially the same location in the previous frame are determined. The long vehicle is then divided into multiple stopped vehicles based on the number and length of vehicles in the previous frame.

Another method for calculating the stopped delay for each vehicle includes monitoring the location of the front and the rear of a vehicle between consecutive frames. The speed and future position of the vehicle are then calculated. The vehicle is considered stopped if it is determined that its speed is below a specified stopping speed. The total stopped delay for the vehicle over consecutive frames is then calculated.

If it is determined that a vehicle overlaps another vehicle, the division between vehicles is maintained through a ratio of the vehicle lengths before the vehicles were viewed as overlapping. Furthermore, when a vehicle leaves an intersection, if the vehicle becomes longer than an allowed vehicle length growth percentage, the rear of the vehicle is separated from the front of the following vehicle so that the vehicle does not become longer than the allowed vehicle length growth percentage.

The average stopped delay per vehicle is then calculated by calculating the total stopped delay of all digital images or the total stopped delay of all vehicles. This value is then divided by the total number of vehicles that entered the intersection during the analysis period.

A computing device configured for estimating the average stopped delay per vehicle at a signalized intersection is also provided. The computing device includes a processor and memory in electronic communication with the processor. The computing device also includes executable instructions that can be executed by the processor. The executable instructions are configured to initialize the background intensities of a line of pixels along a traffic lane without vehicles in a digital image of an actual intersection. The executable instructions are also configured to identify a vehicle by measuring the intensities of the line of pixels in a different digital image of the same intersection with vehicles. The stopped delay for each vehicle or digital image with vehicles is calculated. The average stopped delay per vehicle is then calculated.

A computer-readable medium for storing program data is provided as well. The program data includes executable instructions for implementing a method for estimating an average stopped delay per vehicle at a signalized intersection. In the method, the background intensities of a line of pixels in a digital image of an actual traffic lane without vehicles are initialized. Vehicle location is identified by measuring intensities of the line of pixels in a different digital image of the same intersection with vehicles. The stopped delay for each vehicle or each digital image with vehicles is calculated. The average stopped delay per vehicle is then calculated.

It will be readily understood that the components of the embodiments as generally described and illustrated in the Figures herein could be arranged and designed in a wide variety of different configurations. Thus, the following more detailed description of the embodiments of the systems and methods of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Several aspects of the embodiments described herein will be illustrated as software modules or components stored in a computing device. As used herein, a software module or component may include any type of computer instruction or computer executable code located within a memory device and/or transmitted as electronic signals over a system bus or network. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction, or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices.

Note that the exemplary embodiment is provided as an exemplar throughout this discussion; however, alternate embodiments may incorporate various aspects without departing from the scope of the present invention.

The order of the steps or actions of the methods described in connection with the embodiments disclosed herein may be changed by those skilled in the art without departing from the scope of the present invention. Thus, any order in the Figures or detailed description is for illustrative purposes only and is not meant to imply a required order.

FIG. 1 is a block diagram illustrating a system 100 for estimating the average stopped delay per vehicle at a signalized intersection. This system 100 uses digitized still images or frames 102 of actual traffic flow to estimate the average stopped delay per vehicle. The digitized frames 102 may come from traffic cameras that are ubiquitously available in many large to medium-sized cities. The cameras may be digital and directly produce digital images 102, or the cameras may provide analog video that is subsequently converted into a plurality of digitized images 102.

Time data 104 is also inputted into the system 100 for estimating the average stopped delay per vehicle. The time data 104 may be the time interval between each frame 102, or alternatively could be a time stamp associated with each frame 102. Either type of time data allows for the determination of the time period that elapses between consecutive frames.

Another form of input into the system 100 for estimating the average stopped delay per vehicle is street length data 106. Such data may include actual lengths per pixel of the digitized frame at the upstream and downstream ends of an image analysis line of pixels that will be discussed with greater detail in conjunction with FIG. 2. The street length data 106 may also include an actual length at an intermediate estimation point expressed as a percent of the image analysis line of pixels from the downstream end of the line. Street length data 106 is used to determine the length and position of any given vehicle in a particular digitized frame 102.

User input 108 is also entered by a user to specify how certain parameters of the average stopped delay estimator 110 operate. User input may include, among other things, downstream and upstream pixel location for defining a line of pixels along a traffic lane, thresholds for intensity readings, minimum gap limit thresholds, maximum vehicle length limits, minimum vehicle length limits, average vehicle lengths, signaling information, and allowed vehicle length growth percentage, all of which will be discussed in more detail below. Other forms of user input not specifically enumerated above may also be entered, some of which will also be discussed in more detail below.

User input 108, street length data 106, digitized image data 102 and time data 104 are all inputs to the average stopped delay estimator 110 which represents a process that runs on a computing device for providing an average stopped delay per vehicle estimate 112. As opposed to the ITE manual method for estimating the average stopped delay per vehicle at a signalized intersection, the present system 100 provides an automated approach using digitized still image analysis of actual traffic flow.

Figure 2:
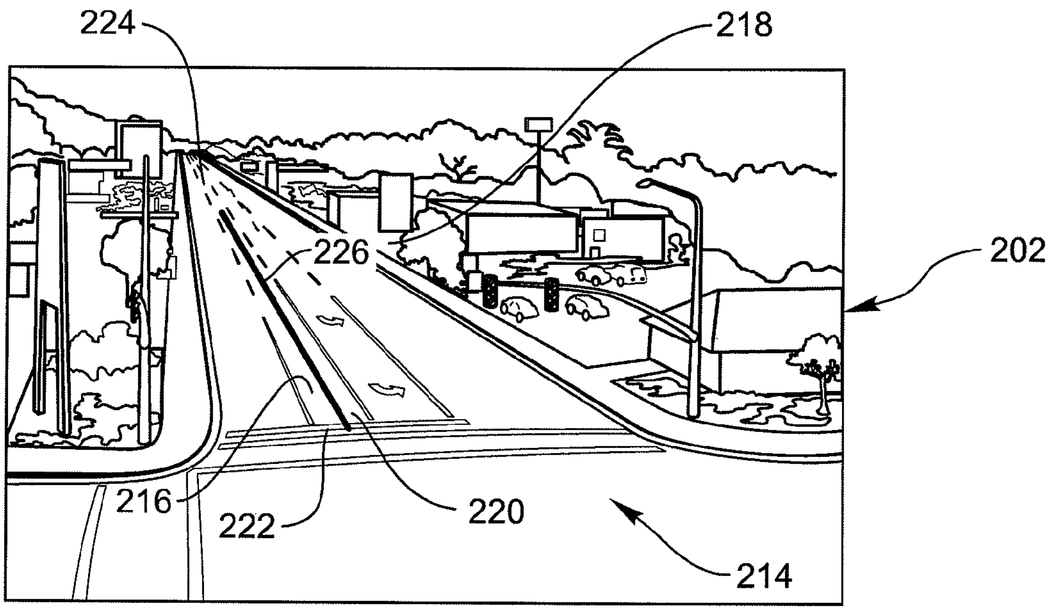
FIG. 2 is a digital image of a perspective view of a signalized intersection without vehicles, taken from the perspective of a traffic camera.

FIG. 2 is a digital image 202 of a perspective view of a signalized intersection 214 taken from the perspective of a traffic camera (not shown). The image 202 does not have any vehicles at the intersection, thus the signalized intersection 214 is considered empty. The image 202 may be obtained from a digital camera that is mounted proximate the intersection 214, or may alternatively be derived from analog camera data that is subsequently digitized. Typically, the images 202 are obtained from closed-circuit television ("CCTV") cameras. CCTV cameras are ubiquitously available in many large to medium-sized cities.

The digital image 202 also depicts one or more traffic lanes 216 that lead toward and away from the signalized intersection 214. The intersection 214 is signalized through the use of a traffic signal 218 which controls the flow of traffic through the intersection 214. For reference, the traffic lane 216 has a proximal end 220 which is closest to a limit line 222 that marks the entrance into the intersection 214. The traffic lane 216 also has a distal end 224 which is further up the flow of traffic. Vehicles traveling on the traffic lane 216 approach the intersection 214 from the distal end 224 toward the proximal end 220, and come to a stop before the limit line 222 if the traffic signal 218 indicates such.

The digital image 202 obtained from the camera may be from alternative perspectives, such as viewed from directly overhead the traffic lane 216 instead of off to one side as depicted in FIG. 2. Additionally, there may be various directions of camera view that could be used to obtain images of the signalized intersection 214.

Also illustrated in FIG. 2, is a line of pixels 226 that extends along the traffic lane 216. Pixels are the basic unit of composition of the digital image 202. The line of pixels 226 is used as a digital sensor to identify vehicles traveling within the traffic lane 216. The line of pixels 226 is created by designating a first pixel point adjacent the proximal end 220 of the traffic lane 216 and a second pixel point that is adjacent the distal end 224 of the traffic lane 216. The use of the line of pixels 226 will be discussed in greater detail below.

Figure 3:
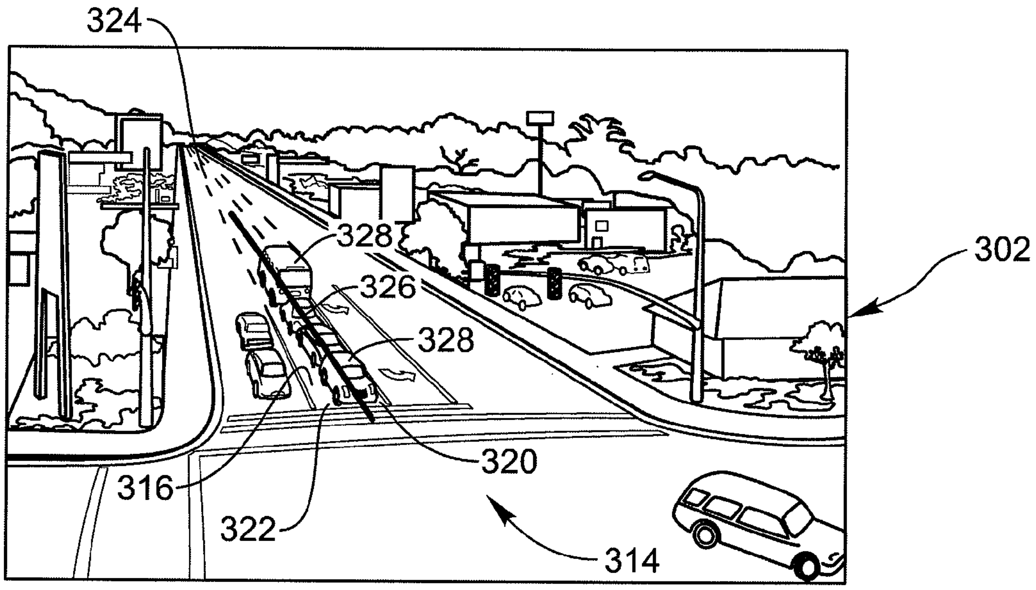
FIG. 3 is another digital image of a perspective view of the signalized intersection of FIG. 2 with vehicles, taken from the perspective of the traffic camera.

FIG. 3 is a representation of another digital image 302 of a perspective view of a signalized intersection 314 taken from the perspective of the traffic camera used to produce the image shown in FIG. 2. This image 302 shows several vehicles 328 within the traffic lane 316. Some of the vehicles 328 are at a proximal end 320 of the lane 316 and stopped before the limit line 322 previous to entering the intersection 314. The vehicles 328 approach the intersection 314 from a distal end 324 of the traffic lane 316.

The line of pixels 326 intersects the vehicles 328 within the traffic lane 316, such that the line of pixels 326 extends through the length of the vehicles 328. Because of the angle of the camera that was used to obtain the image 302, the lengths of the vehicles 328 along the line of pixels 326 appear shorter at the distal end 324 of the traffic lane 316, and get longer as the vehicles 328 approach the proximal end 320. Consequently, vehicles 328 stopped at the limit line 322 intersect a larger number of pixels of the pixel line 326 than vehicles 328 further up the queue. Each pixel in the line of pixels 326 therefore, represents a different length in real space. A pixel in the line of pixels 326 near the proximal end 320 of the traffic lane 316 represents a shorter length than does a pixel near the distal end 324 of the traffic lane 316. The significance of this reality and how it is accounted for in the systems and methods of the present invention will be discussed in more detail in conjunction with FIG. 5.

Figure 4:
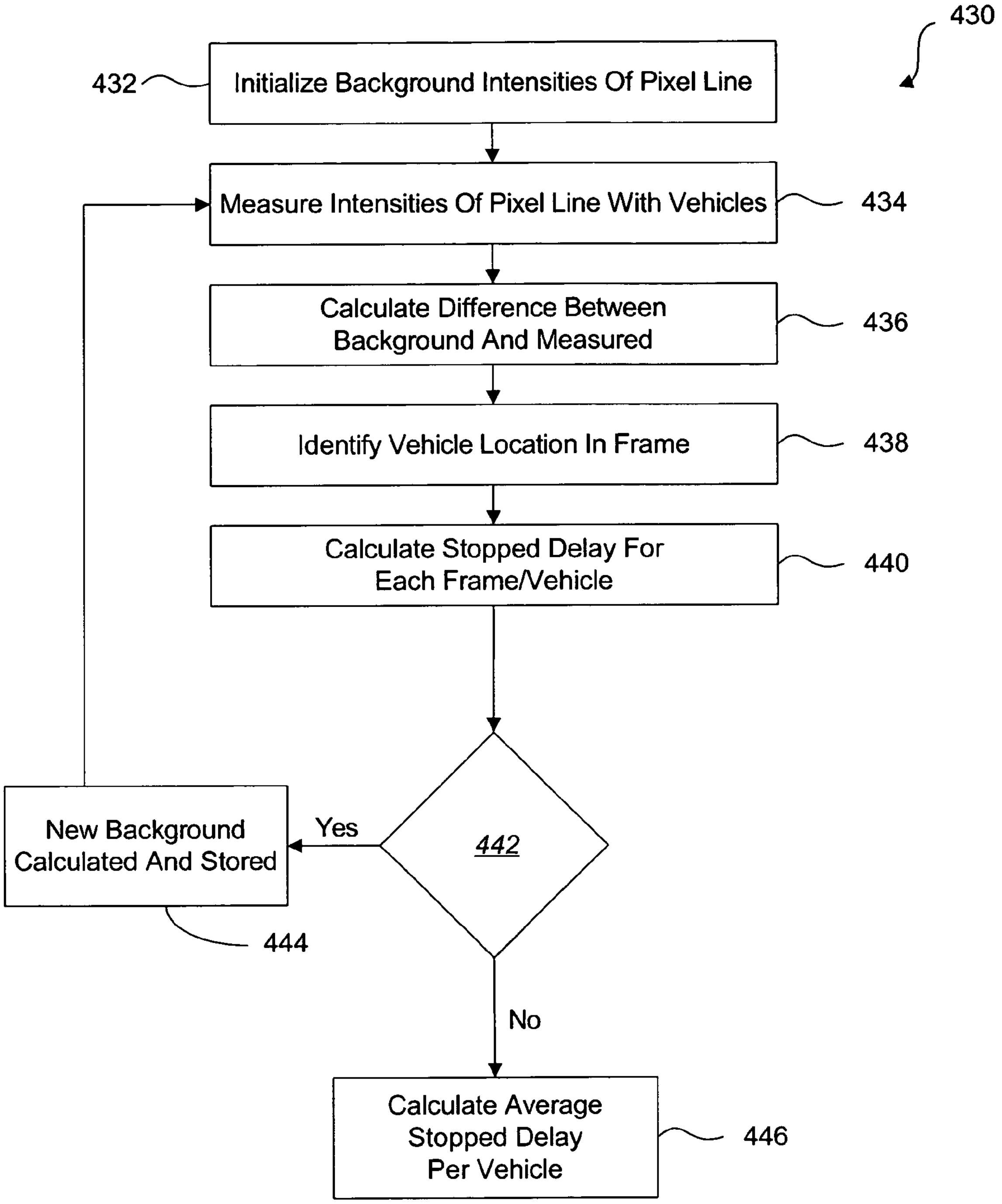
FIG. 4 is a flow diagram of one embodiment of a method for estimating the average stopped delay per vehicle at a signalized intersection.

FIG. 4 is a flow diagram of one embodiment of a method for estimating 430 the average stopped delay per vehicle at a signalized intersection. According to this method, the estimation 430 of average stopped delay per vehicle at a signalized intersection is automated, using digitized still image analysis of actual traffic flow. This method is used to address the potential problems associated with applying automated processes to image data of real traffic flow, which, among other things, includes camera position, direction of camera view, parallax, vehicle color, pavement color and crowding of vehicles caused by parallax.

Since real image frames of traffic flow at a signalized intersection are used to estimate 430 the average stopped delay per vehicle, frames with vehicles are compared to a frame without vehicles. Accordingly, the method includes the step of initializing 432 the background intensities of the line of pixels that extends through the pertinent traffic lane without vehicles (see FIG. 2). This step includes selecting a frame of the traffic lane that is clear of vehicles.

The line of pixels selected extends along the traffic lane from the intersection to a point upstream in the lane, as illustrated and described in conjunction with FIG. 2. The graphical intensities of each pixel in the line of pixels is read and stored in memory. According to one embodiment, the graphical images used are monochrome, with pixel intensities ranging from a numeral scale of black (0) to white (255). Those with skill in the art will realize that alternative methods for measuring pixels intensities may be used, including those that involve the analysis of color instead of monochrome pixel intensities. Initializing 432 the background intensities of the line of pixels extending through the traffic lane without vehicles will be discussed with more detail in conjunction with FIG. 5.

Another step in the method for estimating 430 the average stopped delay per vehicle is to measure 434 the pixel intensities of the line of pixels on a frame that has vehicles (see for example, FIG. 3). Since vehicles intersect the pixel line, the graphical intensity of the pixel line will vary from the background pixel line intensity where a vehicle is located. The values for the pixel intensities are also stored in memory. Typically, the step of initializing 432 the background intensities of the pixel line is done previous to measuring 434 the intensities of the pixel line in a frame with vehicles. However, as is true with the remaining steps of the present method, as well as other methods disclosed herein, it is possible that this particular order of steps could be reversed or done simultaneously or performed in a different order.

Once the background pixel intensities are initialized 432 and the pixel intensities of a frame or frames with vehicles are measured 434, the difference between the pixel intensity values of the background and the frame with vehicles is calculated 436. Since the color of a vehicle varies from vehicle to vehicle, the result of the calculation 436 may yield signal intensities that are positive, such as when a white or bright vehicle is present, or signal intensities that are negative, such as when a black or dark vehicle is present.

Once the difference between pixel intensity values between the background and the frame with vehicles is calculated 436, the location of each vehicle is identified 438. A vehicle is identified 438 from the difference calculation 436 performed in the previous step. Any pixel in the line of pixels with an intensity difference outside a specified threshold is considered to be part of a vehicle. The appropriate threshold value may be determined through the consideration of several factors, but essentially constitutes an appropriate signal to noise ratio value given the circumstances. A group of consecutive pixels that have difference intensity values outside the threshold, without a significant gap, may be considered a vehicle. The gap may be defined by any group of consecutive pixels that do not have intensity differences outside of the threshold, whose combined length is over a specified gap limit. Accordingly, the location of each vehicle is identified 438 by a span of pixels in the line of pixels that differ from the background pixel intensities.

Once the vehicle location is identified 438 in a particular frame or frames, the stopped delay for a particular vehicle or frame is calculated 440. This may be done according to several different methods utilizing different algorithms as will be discussed in greater detail in conjunction with the discussion of FIGS. 6-8. At least one of these methods is used to calculate 440 the total stopped delay for all vehicles in a particular frame. Another method is used to calculate 440 the stopped delay for a particular vehicle over the span of several frames. Either method will provide data sufficient to estimate 430 the average stopped delay per vehicle.

Once the stopped delay for each frame or vehicle is calculated 440, it is determined 442 whether additional frames are to be analyzed. The frames are obtained from analog or digital CCTV cameras that are positioned at many intersections in most metropolitan areas. If a digital camera is used, the frames may be analyzed using the present method as they are acquired, i.e., in real-time. Alternatively, digital frames may be analyzed at a later time if desired. If an analog CCTV camera is used, then certain frames are obtained at specified time intervals and are digitized accordingly. It may be determined 442 that more frames are to be analyzed if there is additional video that needs to be analyzed. However, it may be determined 442 that more frames do not need to be analyzed if all frames or video have already been analyzed according to the method described.

If it is determined 442 that more frames are to be analyzed, then a new background is calculated and stored 444. This may be accomplished by averaging the intensities of the pixels that are not inside a vehicle into the background pixel intensities. A pixel is considered not inside a vehicle when the pixel intensity is not outside the threshold and is part of the gap as defined above. This new background is used in the calculations with the next frame. The method for estimating 430 the average stopped delay per vehicle is essentially repeated where the pixel intensities for the next frame are measured 434 and analyzed in conjunction with the new background as described.

If it is determined 442 that more frames do not need to be analyzed, then the data resulting from calculating 440 the stopped delay for each frame or vehicle is used to calculate 446 the average stopped delay per vehicle. The process for calculating 446 the average stopped delay per vehicle is described in greater detail in conjunction with the discussion of FIG. 9. Accordingly, the process for estimating 430 the average stopped delay per vehicle provides an automated method using digitized still image analysis of actual traffic flow. The method for estimating 430 average stopped delay per vehicle is accomplished without the labor intensive methods associated with the ITE manual method and helps traffic engineers to reduce the inaccuracies inherent in human-collected data.

Figure 5:
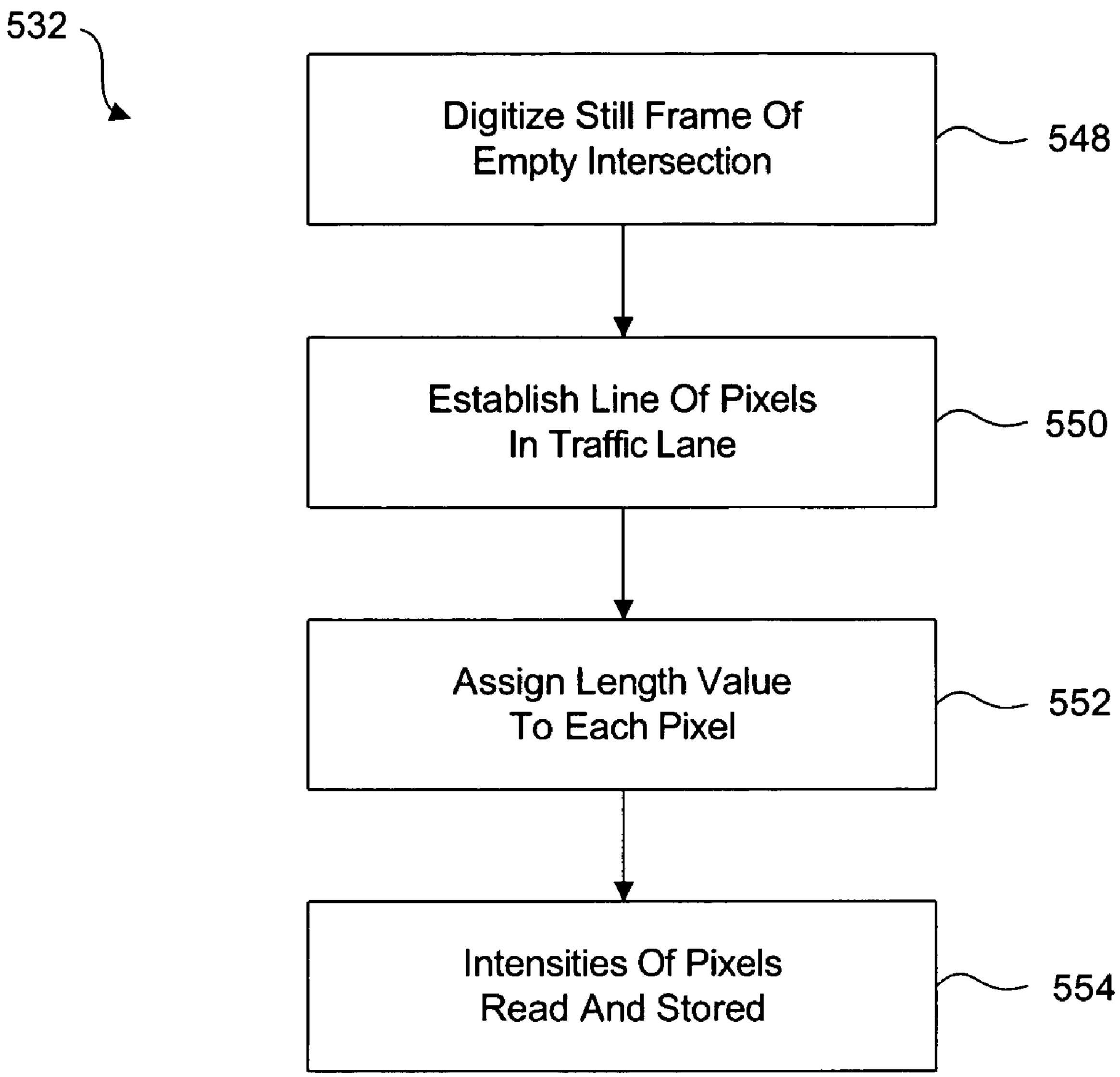
FIG. 5 is a flow diagram of one embodiment of a method for initializing background intensities of a line of pixels in a digital image of an actual traffic lane.

FIG. 5 is a flow diagram of one embodiment of a method for initializing 532 background intensities of a line of pixels in a digital image of an actual traffic lane. In order to create a background from which to measure an intersection having traffic, a still image or frame of the signalized intersection without vehicles is digitized 548. This digitization 548 may be accomplished by converting an analog video stream into a plurality of digital frames. One of the digital frames that does not have vehicles in the relevant lane is used as the background. Alternatively, the digitized frame may be created by a digital CCTV camera or the like.

Once the frame of the empty intersection is digitized 548, a traffic engineer or other user establishes 550 a line of pixels that extends through the traffic lane. This may be accomplished through the use of a user interface component of a software module that performs the method described in conjunction with FIG. 4. Through the user interface component, a user selects two pixels as end points of the line of pixels. One pixel is selected at the proximal end 220 of the traffic lane 216 as shown in FIG. 2. This pixel may be located adjacent the limit line 222 that marks the entrance to the signalized intersection 214. The second pixel is selected upstream at the distal end 224 of the traffic lane 216. The resulting line of pixels having a width of one-pixel extends along the path that vehicles will travel down the traffic lane 216.

Referring still to FIG. 5, a length value is assigned 552 to each pixel once the line of pixels is established 550. Because of the angle of the camera, the lengths of the vehicles that approach the intersection along the line of pixels appear shorter near the distal end of the traffic lane and get longer as the vehicle approaches the intersection. The same is true of the length of pavement of the traffic lane that is covered by each pixel. A single pixel covers a shorter distance at the proximal end adjacent the intersection than a pixel at the distal end upstream from the intersection. According to one embodiment, in order to maintain uniform vehicle length along the entire line of pixels, a length value is assigned 552 to each pixel by linearly interpolating between three real world lengths describing the first pixel at the proximal end, the last pixel at the distal end, and an intermediate pixel between the first and last pixel which formed the line. Alternative methods for assigning 552 a length value to each pixel may also be used in place of linear interpolation of three pixels, as would be apparent to one having skill in the art.

Once the frame having a traffic lane clear of vehicles is digitized 548 and the line of pixels is established 550, the intensities of each pixel in the line of pixels is read and stored 554. According to one embodiment, the digitized images are monochrome images having pixel intensities that range from black (0) to white (255). Each pixel in the line of pixels over the relevant empty traffic lane has some intensity value that represents the relative intensity of the section of pavement upon which the pixel is overlaid. Those with skill in the art will recognize that alternative methods for measuring 554 pixel intensities may be employed, including those that involve the analysis of color instead of just monochrome pixel intensities.

Figure 6:
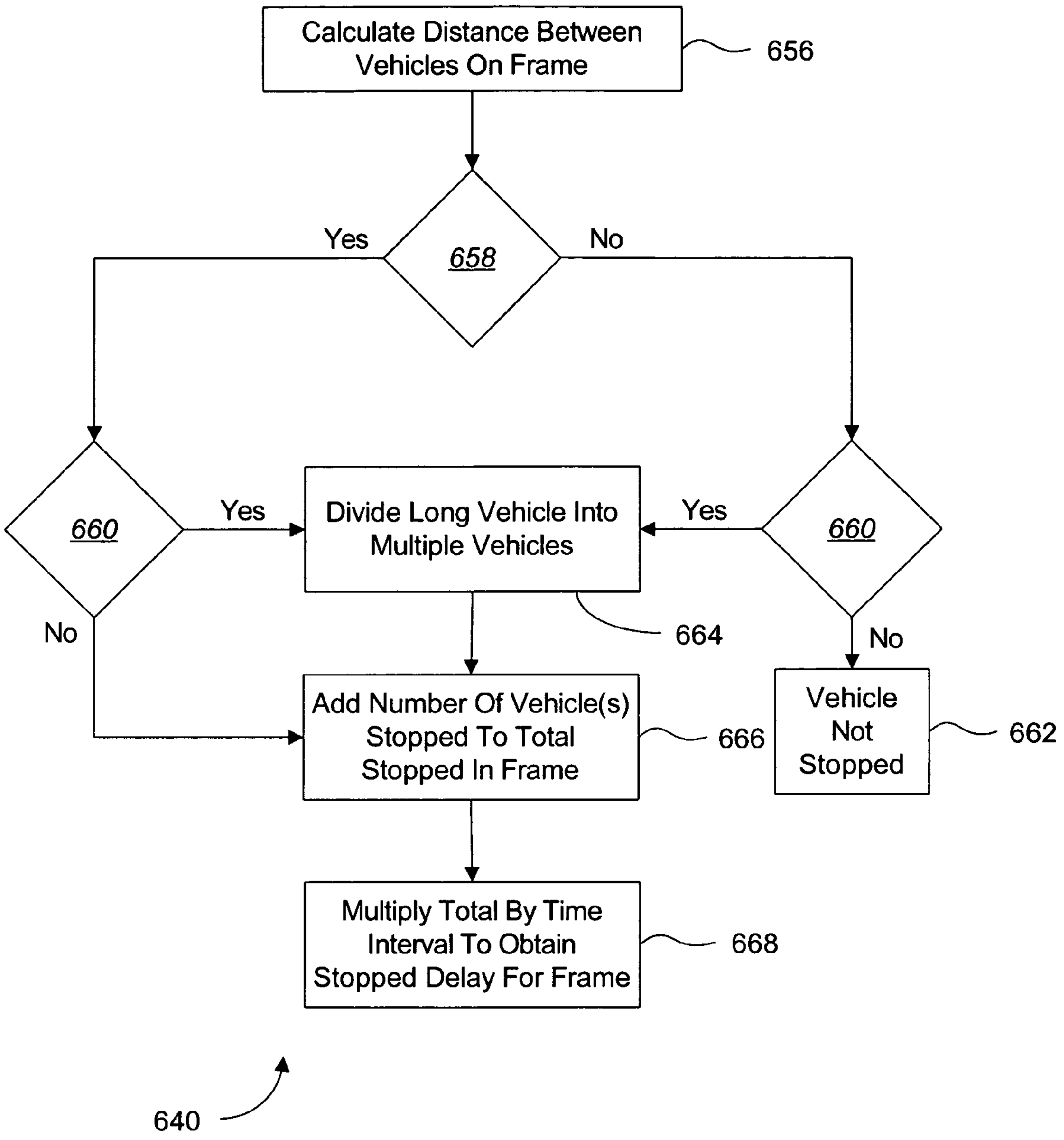
FIG. 6 is a flow diagram of one embodiment of a method for calculating the stopped delay for each digital image.

FIG. 6 is a flow diagram of a first embodiment of a method for calculating 640 the total stopped delay of all vehicles in a given digital image. The image analyzed is one that has traffic in the traffic lane as represented by example in FIG. 3. According to this first embodiment, the distance between vehicles along the line of pixels is calculated 656 for every real image frame. As discussed above, vehicles are identified on the line of pixels by calculating the difference in pixel intensity values between the background and the frame with vehicles. A group of consecutive pixels that have difference intensity values outside of a given threshold, without a significant gap, are considered a vehicle. The distance between vehicles is calculated 656 by determining the length of the traffic lane between vehicles that is exposed to the camera, thus providing a length of pixels in the line of pixels that have intensities comparable to those of the background.

Once the vehicles have been identified and the distance between them have been calculated 656, it is determined 658 whether this distance between vehicles is below a specified gap distance. According to one embodiment, the specified gap distance is user defined, and entered into the user interface component of a software module that performs the method described herein. When the gap in front of a given vehicle is below the specified gap distance, the vehicle is considered stopped.

In analyzing images from real world traffic flow, as vehicles slow down and approach a queue of vehicles at an intersection, the gaps between vehicles are not noticeable because of the camera angle. Even though in actuality two vehicles are not in contact with each other, when one comes to a stop close behind the other, the camera may not be able to view the pavement between them depending on the position and angle of the camera. Consequently, using the method for identifying vehicles as described above, the computing device and/or software algorithms will view these vehicles as one long vehicle.

Accordingly, the first embodiment for calculating 640 the stopped delay for each image queries 660 whether a particular vehicle is greater than a specified maximum length. In either event that the distance between vehicles is greater than or less than the specified gap distance, the method determines 660 if the vehicle is longer than the specified length. Again, according to one embodiment, the specified maximum vehicle length is user defined.

If the distance between vehicles is greater than the specified gap distance, and the rear vehicle is not longer than the specified vehicle length, the vehicle is considered to be moving 662 and not stopped. However, if the distance between vehicles is less than the specified gap distance, and the rear vehicle is not longer than the specified vehicle length, the vehicle is considered a single, stopped vehicle.

If it is determined 660 that the vehicle is longer than the specified maximum vehicle length, then the vehicle is considered to be at least two stopped vehicles. The number of vehicles that comprise the mistakenly long vehicle is determined by dividing 664 the long vehicle into a specified average vehicle length. The specified average vehicle length may be user defined, and entered into the user interface component of a software module that performs the method described herein. Any remaining length that is shorter than the average vehicle length, but longer than a specified minimum vehicle length is also counted as another vehicle. Consequently, what the software sees as an overly lengthy vehicle is divided up by average vehicle lengths and each division is counted as a stopped vehicle for purposes of calculating 640 the stopped delay for each frame.

According to one embodiment, a user may create user input in the form of signaling information. The red light and green light cycles may be entered as a control parameter into the software that is used to run the methods described. If one frame shows a single vehicle at the intersection, the vehicle may be counted as stopped if there is a red light and the vehicle's proximity to the limit line is within the specified gap distance. Conversely, the single vehicle may be considered to be moving 662 if the signal is green. The entering of signaling information may also remedy problems associated with pedestrians or large vehicles that travel in cross directions in front of the vehicle stopped at the limit line.

For each frame the number of vehicles stopped is added 666 together to determine the total number of vehicles stopped within the frame. Although moving vehicles are counted for purposes of monitoring the total number of vehicles that pass through the intersection, only the stopped vehicles are added 666 together. The total number of stopped vehicles is then multiplied 668 by the specified time interval between frames. The resulting value represents the total stopped delay for the particular frame, and is used in conjunction with the method described in FIG. 4 to determine the average stopped delay per vehicle.

Figure 7:
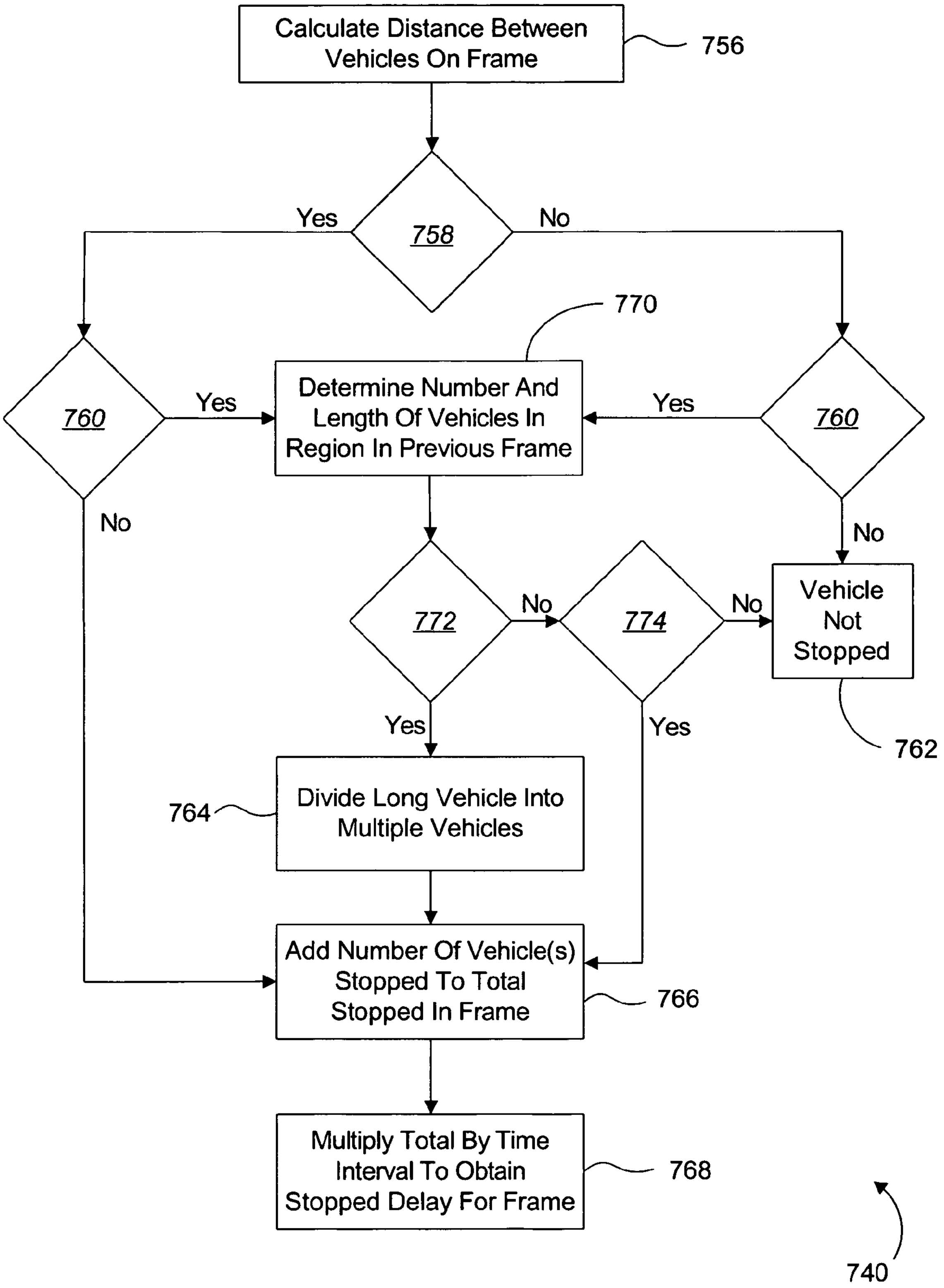
FIG. 7 is a flow diagram of an alternative embodiment of a method for calculating the stopped delay for each digital image.

FIG. 7 is a flow diagram of a second embodiment of a method for calculating 740 the stopped delay of vehicles in each digital image. This second embodiment is similar to the first embodiment for calculating 640 stopped delay per image, but differs in that the second embodiment integrates a time element to prevent the possible miscounting of overlapping vehicles that may occur in the first embodiment.

According to the second embodiment for calculating 740 the total stopped delay in a particular frame, the distance between vehicles along the line of pixels is calculated 756 for every real image frame. The distance between vehicles is calculated 756 by determining the length of the traffic lane between the rear of a leading vehicle and the front of a following vehicle. This is accomplished by measuring the length of pixels in the line of pixels that have intensities comparable to those of the background.

Once the vehicles in the frame have been identified and the distance between them have been calculated 756, it is determined 758 whether this distance between vehicles is below a specified gap distance. As with the first embodiment discussed above, the specified gap distance in the second embodiment may be user defined, and entered into the user interface component of a software module that performs the method described herein. When the gap in front of a given vehicle is below the specified gap distance, the vehicle is considered stopped.

As was discussed above, when a vehicle comes to a stop close to the rear of another vehicle, the gap between the two may not be observable, and the two vehicles may appear as one long vehicle. Consequently, it is determined 760 whether a particular vehicle is greater than a specified maximum length. In either event that the distance between vehicles has a length greater than or less than the specified gap distance, the method determines 760 if the vehicle is longer than the specified maximum length.

If the distance between vehicles is greater than the specified gap distance, and the rear vehicle is not longer than the specified vehicle length, the vehicle is considered to be moving 762. However, if the distance between vehicles is less than the specified gap distance, and the rear vehicle is not longer than the specified vehicle length, the vehicle is considered a single, stopped vehicle.

If it is determined 760 that the vehicle is longer than the specified maximum vehicle length, the method then determines 770 the number and lengths of the vehicles that occupied the same region as the long vehicle in the preceding frame. Using the number of vehicles in the queue from the previous frame improves the count of vehicles stopped in the queue of the current frame being analyzed. Unlike the first embodiment for calculating 640 the stopped delay for each image, the second embodiment 740 does not divide long vehicles into average vehicle lengths. Instead, it evaluates the previous frame to determine 772 if there was more than one vehicle in the same region of the long vehicle.

If only one long vehicle existed in the previous frame, the method then queries 774 whether the first question 758 was answered affirmatively, namely whether the distance between vehicles was below a specified gap distance. If it was earlier determined 758 that the distance between vehicles was not less than the specified gap distance, then the vehicle is considered to be moving 762. However, if it was earlier determined 758 that the distance between vehicles was less than the specified gap distance, then the vehicle is considered to be a long, stopped vehicle.

If more than one vehicle existed in the previous frame in the region of the lengthy vehicle of the current frame, the long vehicle is divided 764 into multiple vehicles in proportion to the vehicle sizes in the previous frame. Consequently, differing vehicle proportions are maintained because the second embodiment of the method for calculating 740 the stopped delay for each image uses the vehicle lengths in the previous frame to determine 770 each vehicle's size in proportion to the long vehicle in the current frame.

For a given frame the number of vehicles stopped is added 766 together to determine the total number of vehicles stopped within the frame. The total number of stopped vehicles is then multiplied 768 by the specified time interval between frames. The resulting value represents the total stopped delay for the particular frame, and is used in conjunction with the method described in FIG. 4 to determine the average stopped delay per vehicle.

Figure 8:
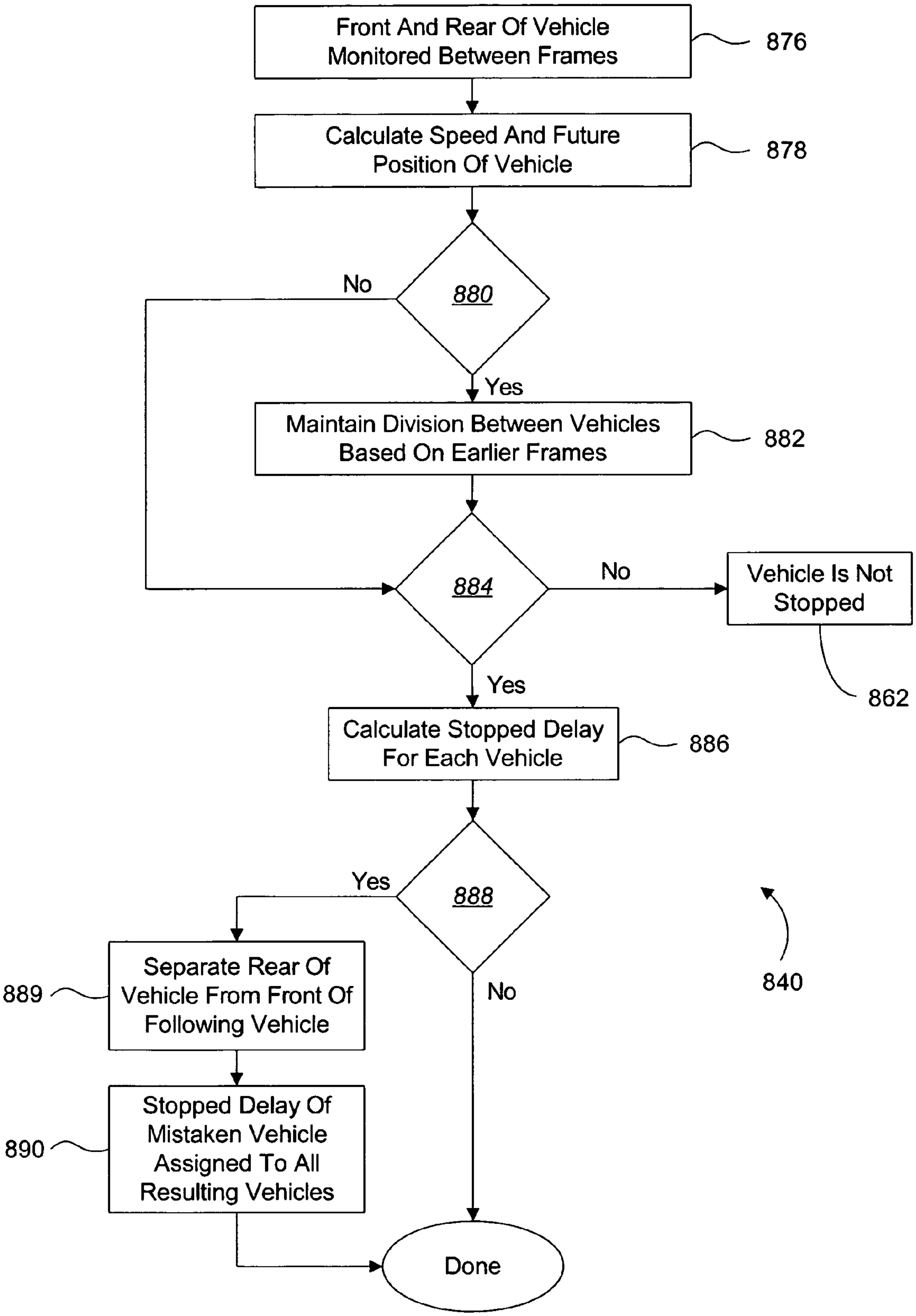
FIG. 8 is a flow diagram of another alternative embodiment of a method for calculating the stopped delay for each vehicle.

FIG. 8 is flow diagram of a third embodiment of a method for calculating 840 the stopped delay for each vehicle. Unlike the first two embodiments 640, 740 for calculating the stopped delay for each frame, the third embodiment 840 does not evaluate gaps between vehicles to determine whether a vehicle is stopped, but instead tracks individual vehicle movement through time to determine vehicle speed and position.

For a given vehicle that appears on a series of frames, the front and rear of each vehicle are monitored 876 and updated between frames to determine if there has been movement of the vehicle. The speed of the front of the vehicle and the speed of the rear of the vehicle are calculated 878 by measuring the distance each moved and divided by the specified time increment between frames. The average of the speed of the front of the vehicle and the speed of the rear of the vehicle is then used to set the overall vehicle speed and to predict 878 the future position of the vehicle.

As the speed and future position of a particular vehicle is calculated, it is determined 880 whether multiple vehicles in one frame merge into one long vehicle in the next. If multiple vehicles merge into one long vehicle, then the division between the vehicles is maintained 882 by a ratio of vehicle lengths before the vehicles were viewed as overlapping. The speed of each overlapping vehicle is calculated from the front end or rear end of that vehicle, whichever is not overlapping another vehicle. If both ends of the vehicle are overlapped by other vehicles, the average speed of the predicted front and rear of the vehicle is used as discussed previously. Consequently, individual vehicle positions and speeds are preserved, even when overlapping in a given queue.

As the vehicle positions are monitored 876, and their speed and future positions are calculated 878, it is determined 884 whether a particular vehicle is moving slower than a specified stopping speed. If the vehicle is moving at a speed greater than the specified stopping speed, then the vehicle is considered not stopped 862. However, if the vehicle is moving at a speed less than a specified stopping speed, then the vehicle is considered stopped. The specified stopping speed for this third embodiment for calculating 840 the stopped delay for each vehicle may be user defined and entered into a user interface component of a software module that performs the method described herein.

If the vehicle is considered stopped because it is moving slower than the specified stopping speed, the stopped delay for each vehicle is calculated 886. The stopped delay for a vehicle is increased by the specified time interval between frames for each frame that the speed of the vehicle is below the specified stopping speed. Therefore, according to this embodiment, the stopped delay for each individual vehicle is calculated 886 over the span of several frames, instead of calculating the stopped delay for all vehicles in a single frame. This value is used to calculate 446 the average stopped delay per vehicle as described in conjunction with FIG. 4.

Referring still to FIG. 8, after the stopped delay for a single vehicle is calculated 886 over the course of several frames, the vehicles will pull out of the queue and enter the intersection after the traffic light turns green. The vehicles entering the intersection are further monitored to determine 888 whether a particular vehicle becomes longer than an allowed vehicle length growth percentage, and whether a mistakenly single vehicle turns into multiple vehicles. If what was mistakenly viewed as a single vehicle as the vehicle came to a stop is in all actuality two or more vehicles, then the front of the vehicle will move while the rear remains stationary as the vehicles first start to enter the intersection. Accordingly, the method described herein will view this as a single vehicle becoming longer or being stretched, when actually there are two vehicles. When entering the intersection the front vehicle begins to move before the rear vehicle, thus giving the appearance of a single vehicle becoming longer through each frame.

Therefore, vehicles are evaluated 888 against an allowed vehicle length growth percentage. According to one embodiment, this specified vehicle length growth percentage may be a user defined value. If the length of the vehicle does not increase greater than the allowed percentage change, the vehicle is considered to be a single vehicle entering the intersection. However, if the vehicle "stretches" and its length increases greater than the allowed percentage change, then the rear of the vehicle is considered to be located within the front of the following vehicle. The length of the vehicle is not allowed to be greater than the allowed percentage change, which forces separation 889 of the rear of the vehicle from the front of the following vehicle.

Furthermore, if an interior gap develops in the middle of a mistakenly long vehicle as the vehicle enters the intersection, the mistakenly long vehicle is also counted as being composed of multiple vehicles. A mistakenly long vehicle will be split into its multiple vehicle components if it is determined 888 that the vehicle length grows above a specified percentage or internal gaps develop. The stopped delay of this mistaken vehicle will then be assigned 890 to all resulting vehicles.

Depending on the view and angle of the camera, it may be difficult to distinguish vehicles as they leave the queue and enter the intersection if there is a lot of overlap in stopped vehicles. This third embodiment 840 may falsely view vehicles speeding up almost instantly when entering the intersection. This may lead to an overestimate of the number of vehicles counted as entering the intersection and thus would decrease the estimated average stopped delay per vehicle. Therefore, the third embodiment for calculating 840 the stopped delay for each vehicle may alternatively include the step of monitoring the acceleration rate of vehicles entering the intersection. A user defined maximum acceleration rate may be added, ensuring that new vehicles entering the intersection cannot accelerate faster than is physically possible.

Figure 9:
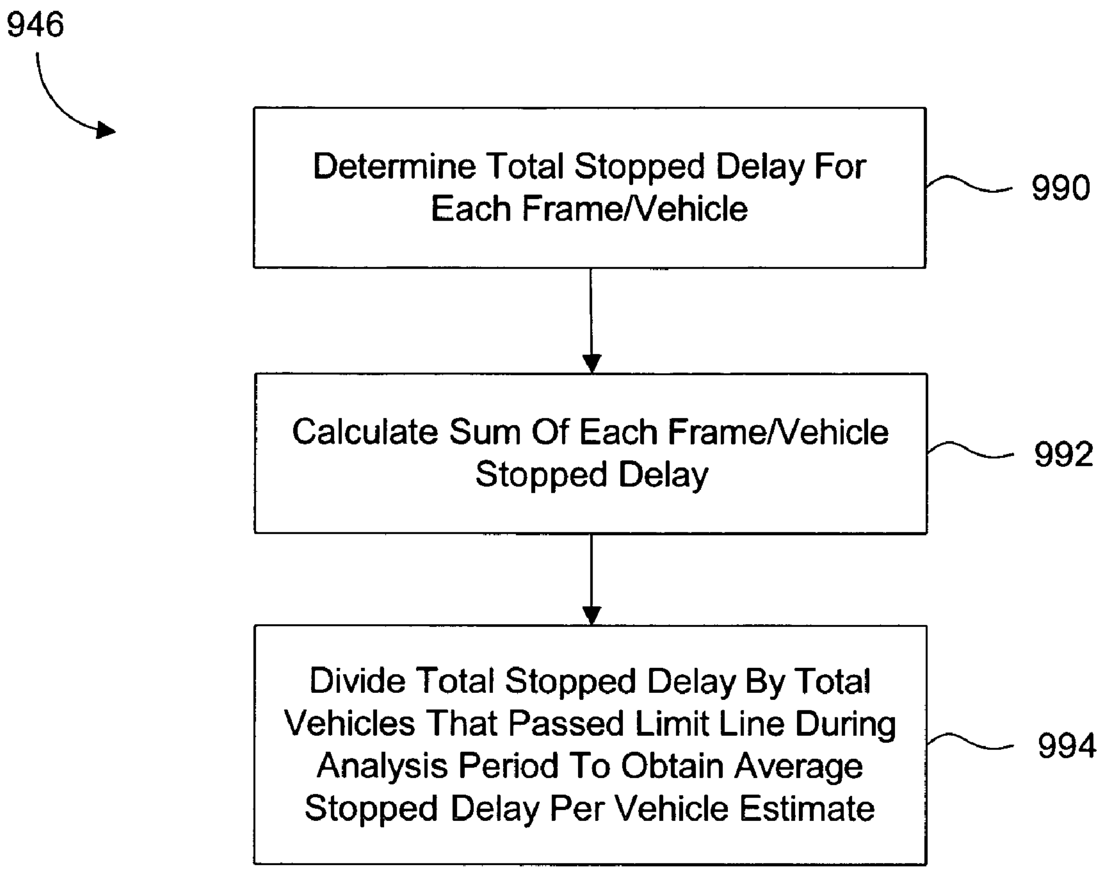
FIG. 9 is a flow diagram of one embodiment of a method for calculating the average stopped delay per vehicle.

FIG. 9 is a flow diagram of one embodiment of a method for estimating 946 the average stopped delay per vehicle, as the concluding step 446 in the method discussed in conjunction with FIG. 4. According to this method, the total stopped delay for each digital frame or for each vehicle is determined 990. The total stopped delay for each vehicle frame is determined 990 according to the first and second embodiments 640, 740 for calculating the total stopped delay for a particular frame. The total stopped delay for a particular vehicle is determined 990 according to the third embodiment 840 for calculating the stopped delay for each vehicle.

The sum of the total stopped delay in all frames or of all vehicles is subsequently calculated 992. The total stopped delay for all frames or vehicles is then divided 994 by the total number of vehicles that passed through the limit line and into the intersection during the analysis period. The resulting value yields the estimated average stopped delay per vehicle.

Figure 10:
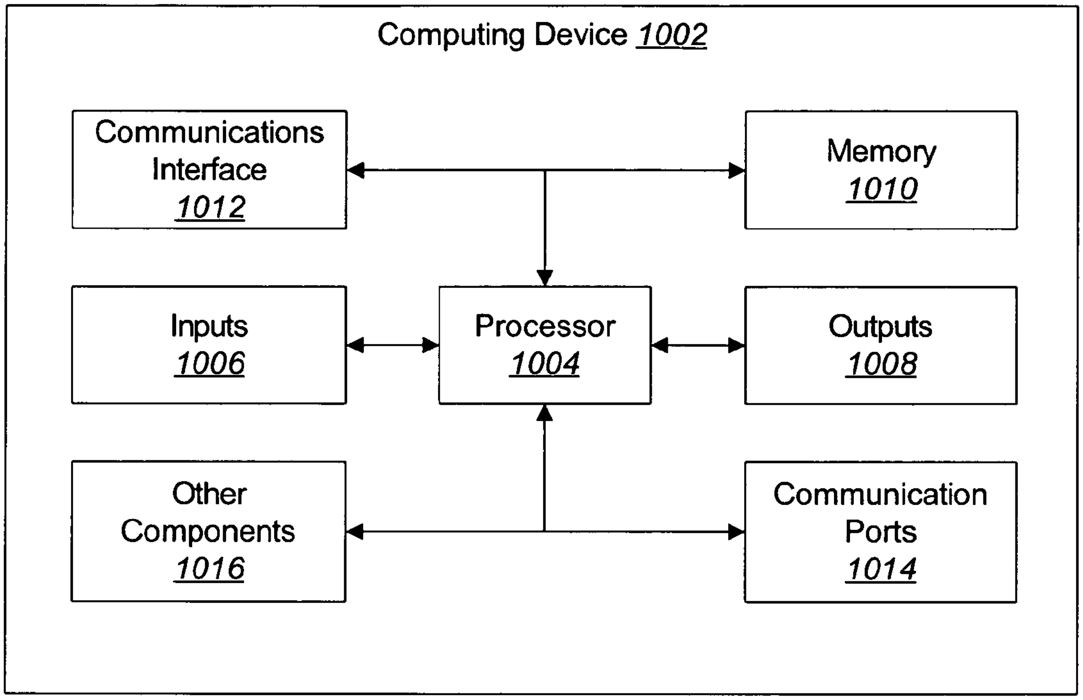
FIG. 10 is a block diagram illustrating the major hardware components typically utilized in a computing device used in conjunction with a system for estimating the average stopped delay per vehicle.

FIG. 10 is a block diagram illustrating the major hardware components typically utilized in a computing device 1002 that is used in conjunction with a system for estimating the average stopped delay per vehicle as described herein. Computing devices 1002 are known in the art and are commercially available. A computing device 1002 typically includes a processor 1004 in electronic communication with input components 1006 and/or output components 1008. The processor 1004 is operably connected to input 1006 and/or output components 1008 capable of electronic communication with the processor 1004, or, in other words, to devices capable of input and/or output in the form of an electrical signal. Embodiments of computing devices 1002 may include the inputs 1006, outputs 1008 and the processor 1004 within the same physical structure or in separate housings or structures.

The electronic device 1002 may also include memory 1010. The memory 1010 may be a separate component from the processor 1004, or it may be on-board memory 1010 included in the same part as the processor 1004. For example, microcontrollers often include a certain amount of on-board memory.

The processor 1004 is also in electronic communication with a communication interface 1012. The communication interface 1012 may be used for communications with other computing devices, servers, etc. The computing device 1002 may also include other communication ports 1014. In addition, other components 1016 may also be included in the computing device 1002.

Of course, those skilled in the art will appreciate the many kinds of different devices that may be used with embodiments herein. The computing device 1002 may be a one-board type of computer, such as a controller, a typical desktop computer, such as an IBM-PC compatible, a PDA, a Unix-based workstation, or any other available computing device that is capable of operating the algorithms and methods disclosed herein. Accordingly, the block diagram of FIG. 10 is only meant to illustrate typical components of a computing device 1002 and is not meant to limit the scope of embodiments disclosed herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for estimating an average stopped delay per vehicle at a signalized intersection, comprising:

initializing background intensities of a line of pixels in a background frame comprising a digital image of an actual traffic lane without vehicles, wherein the line of pixels extends along a path that vehicles travel down the traffic lane and wherein the line of pixels has a length that is sufficient to extend along a length of a plurality of vehicles within the traffic lane;

identifying vehicle location through measuring differences between pixel intensity values along the line of pixels between the background frame and another digital image of the actual traffic lane with vehicles;

calculating a stopped delay for each vehicle; and calculating the average stopped delay per vehicle;

wherein calculating the stopped delay for each vehicle comprises monitoring a location of a front and rear of a vehicle between consecutive frames, calculating a speed and future position of the vehicle, determining whether the vehicle overlaps another vehicle, maintaining a division between the vehicles through a ratio of vehicle lengths before the vehicles were viewed as overlapping, determining the vehicle is stopped if the speed is below a specified stopping speed, and calculating a total stopped delay for the vehicle over consecutive frames.

2. The method of claim 1, wherein initializing background intensities comprises:

digitizing an image of the actual traffic lane without vehicles;

establishing the line of pixels on the digital image of the traffic lane without vehicles, such that the line of pixels extends upstream into the traffic lane;

assigning a length value to each pixel in the line of pixels; and reading and storing the intensities of each pixel in the line of pixels.

3. The method of claim 2, wherein identifying vehicle location comprises:

measuring the intensities of each pixel in the line of pixels on the digital image of the actual traffic lane with vehicles;

calculating the difference between the pixel intensities of the line of pixels on the digital image of the traffic lane without vehicles and the pixel intensities of the line of pixels on the digital image of the traffic lane with vehicles; and identifying a group of consecutive pixels where the difference between pixel intensity is outside of a specified threshold.

4. The method of claim 1, wherein calculating the average stopped delay per vehicle comprises:

calculating a total stopped delay of all vehicles; and dividing the total stopped delay by a total number of vehicles that entered the intersection.

5. A method for estimating an average stopped delay per vehicle at a signalized intersection, comprising:

initializing background intensities of a line of pixels in a background frame comprising a digital image of an actual traffic lane without vehicles, wherein the line of pixels extends along a path that vehicles travel down the traffic lane and wherein the line of pixels has a length that is sufficient to extend along a length of a plurality of vehicles within the traffic lane;

identifying vehicle location through measuring differences between pixel intensity values along the line of pixels between the background frame and another digital image of the actual traffic lane with vehicles;

calculating a stopped delay for each digital image with vehicles; and calculating the average stopped delay per vehicle;

wherein calculating the stopped delay for each digital image with vehicles comprises calculating a distance between vehicles on the digital image with vehicles, determining whether a vehicle is stopped if the distance between vehicles is below a specified gap distance, determining whether a length of the vehicle is greater than a specified maximum length, dividing the vehicle into multiple stopped vehicles based on a specified average vehicle length if the length of the vehicle is greater than the specified maximum length, adding together a total number of vehicles stopped in the digital image with vehicles, and multiplying the total number of vehicles stopped by a time interval between each digital image with vehicles.

6. The method of claim 5, wherein calculating the average stopped delay per vehicle comprises:

calculating a total stopped delay of all digital images with vehicles; and dividing the total stopped delay by a total number of vehicles that entered the intersection.

7. A method for estimating an average stopped delay per vehicle at a signalized intersection, comprising:

initializing background intensities of a line of pixels in a background frame comprising a digital image of an actual traffic lane without vehicles, wherein the line of pixels extends along a path that vehicles travel down the traffic lane and wherein the line of pixels has a length that is sufficient to extend along a length of a plurality of vehicles within the traffic lane;

identifying vehicle location through measuring differences between pixel intensity values along the line of pixels between the background frame and another digital image of the actual traffic lane with vehicles;

calculating a stopped delay for each digital image with vehicles; and calculating the average stopped delay per vehicle;

wherein calculating the stopped delay for each digital image with vehicles comprises calculating a distance between vehicles on the digital image with vehicles, determining whether a vehicle is stopped if the distance between vehicles is below a specified gap distance, identifying a vehicle with a length greater than a specified maximum length, determining a number and length of vehicles in a previous frame in a substantially similar location as the vehicle with the length greater than the specified maximum length, dividing the vehicle with the length greater than the specified maximum length into multiple stopped vehicles based on the number and length of vehicles in the previous frame in the substantially similar location, adding together a total number of vehicles stopped in the digital image with vehicles, and multiplying the total number of vehicles stopped by a time interval between each digital image with vehicles.

8. The method of claim 7, wherein calculating the average stopped delay per vehicle comprises:

calculating a total stopped delay of all digital images with vehicles; and dividing the total stopped delay by a total number of vehicles that entered the intersection.

9. A method for estimating an average stopped delay per vehicle at a signalized intersection, comprising:

initializing background intensities of a line of pixels in a background frame comprising a digital image of an actual traffic lane without vehicles, wherein the line of pixels extends along a path that vehicles travel down the traffic lane and wherein the line of pixels has a length that is sufficient to extend along a length of a plurality of vehicles within the traffic lane;

identifying vehicle location through measuring differences between pixel intensity values along the line of pixels between the background frame and another digital image of the actual traffic lane with vehicles;

calculating a stopped delay for each vehicle; and calculating the average stopped delay per vehicle;

wherein calculating the stopped delay for each vehicle comprises monitoring a location of a front and rear of a vehicle between consecutive frames, calculating a speed and future position of the vehicle, determining the vehicle is stopped if the speed is below a specified stopping speed, calculating a total stopped delay for the vehicle over consecutive frames, determining if the vehicle becomes longer than an allowed vehicle length growth percentage when entering the intersection, and separating the rear of the vehicle from a front of a following vehicle such that the vehicle does not become longer than the allowed vehicle length growth percentage.

10. The method of claim 9, wherein calculating the average stopped delay per vehicle comprises:

calculating a total stopped delay of all vehicles; and dividing the total stopped delay by a total number of vehicles that entered the intersection.

11. A computing device configured for estimating an average stopped delay per vehicle at a signalized intersection, the computing device comprising:

a processor; and memory in electronic communication with the processor, wherein the memory has stored thereon executable instructions executable by the processor to:

initialize background intensities of a line of pixels in a background frame comprising a digital image of an actual traffic lane without vehicles, wherein the line of pixels extends along a path that vehicles travel down the traffic lane and wherein the line of pixels has a length that is sufficient to extend along a length of a plurality of vehicles within the traffic lane;

identify vehicle location through measuring differences between pixel intensity values along the line of pixels between the background frame and another digital image of the actual traffic lane with vehicles;

calculate a stopped delay for each vehicle; and calculate the average stopped delay per vehicle;

wherein calculating the stopped delay for each vehicle comprises monitoring a location of a front and rear of a vehicle between consecutive frames, calculating a speed and future position of the vehicle, determining whether the vehicle overlaps another vehicle, maintaining a division between the vehicles through a ratio of vehicle lengths before the vehicles were viewed as overlapping, determining the vehicle is stopped if the speed is below a specified stopping speed, and calculating a total stopped delay for the vehicle over consecutive frames.

12. The computing device of claim 11, wherein initializing background intensities comprises:

digitizing an image of the actual traffic lane without vehicles;

establishing the line of pixels on the digital image of the traffic lane without vehicles, such that the line of pixels extends upstream into the traffic lane;

assigning a length value to each pixel in the line of pixels; and reading and storing the intensities of each pixel in the line of pixels.

13. The computing device of claim 12, wherein identifying vehicle location comprises:

measuring the intensities of each pixel in the line of pixels on the digital image of the actual traffic lane with vehicles;

calculating the difference between the pixel intensities of the line of pixels on the digital image of the traffic lane without vehicles and the pixel intensities of the line of pixels on the digital image of the traffic lane with vehicles; and identifying a group of consecutive pixels where the difference between pixel intensity is outside of a specified threshold.

14. The computing device of claim 11, wherein calculating the average stopped delay per vehicle comprises:

calculating a total stopped delay of all vehicles; and dividing the total stopped delay by a total number of vehicles that entered the intersection.

15. A computing device configured for estimating an average stopped delay per vehicle at a signalized intersection, the computing device comprising:

a processor; and memory in electronic communication with the processor, wherein the memory has stored thereon executable instructions executable by the processor to:

initialize background intensities of a line of pixels in a background frame comprising a digital image of an actual traffic lane without vehicles, wherein the line of pixels extends along a path that vehicles travel down the traffic lane and wherein the line of pixels has a length that is sufficient to extend along a length of a plurality of vehicles within the traffic lane;

identify vehicle location through measuring differences between pixel intensity values along the line of pixels between the background frame and another digital image of the actual traffic lane with vehicles;

calculate a stopped delay for each digital image with vehicles; and calculate the average stopped delay per vehicle;

wherein calculating the stopped delay for each digital image with vehicles comprises calculating a distance between vehicles on the digital image with vehicles, determining whether a vehicle is stopped if the distance between vehicles is below a specified gap distance, determining whether a length of the vehicle is greater than a specified maximum length, dividing the vehicle into multiple stopped vehicles based on a specified average vehicle length if the length of the vehicle is greater than the specified maximum length, adding together a total number of vehicles stopped in the digital image with vehicles, and multiplying the total number of vehicles stopped by a time interval between each digital image with vehicles.

16. The computing device of claim 15, wherein calculating the average stopped delay per vehicle comprises:

calculating a total stopped delay of all digital images with vehicles; and dividing the total stopped delay by a total number of vehicles that entered the intersection.

17. A computing device configured for estimating an average stopped delay per vehicle at a signalized intersection, the computing device comprising:

a processor; and memory in electronic communication with the processor, wherein the memory has stored thereon executable instructions executable by the processor to:

initialize background intensities of a line of pixels in a background frame comprising a digital image of an actual traffic lane without vehicles, wherein the line of pixels extends along a path that vehicles travel down the traffic lane and wherein the line of pixels has a length that is sufficient to extend along a length of a plurality of vehicles within the traffic lane;

identify vehicle location through measuring differences between pixel intensity values along the line of pixels between the background frame and another digital image of the actual traffic lane with vehicles;

calculate a stopped delay for each digital image with vehicles; and calculate the average stopped delay per vehicle;

wherein calculating the stopped delay for each digital image with vehicles comprises calculating a distance between vehicles on the digital image with vehicles, determining whether a vehicle is stopped if the distance between vehicles is below a specified gap distance, identifying a vehicle with a length greater than a specified maximum length, determining a number and length of vehicles in a previous frame in a substantially similar location as the vehicle with the length greater than the specified maximum length, dividing the vehicle with the length greater than the specified maximum length into multiple stopped vehicles based on the number and length of vehicles in the previous frame in the substantially similar location, adding together a total number of vehicles stopped in the digital image with vehicles, and multiplying the total number of vehicles stopped by a time interval between each digital image with vehicles.

18. The computing device of claim 17, wherein calculating the average stopped delay per vehicle comprises:

calculating a total stopped delay of all digital images with vehicles; and dividing the total stopped delay by a total number of vehicles that entered the intersection.

19. A computing device configured for estimating an average stopped delay per vehicle at a signalized intersection, the computing device comprising:

a processor; and memory in electronic communication with the processor, wherein the memory has stored thereon executable instructions executable by the processor to:

initialize background intensities of a line of pixels in a background frame comprising a digital image of an actual traffic lane without vehicles, wherein the line of pixels extends along a path that vehicles travel down the traffic lane and wherein the line of pixels has a length that is sufficient to extend along a length of a plurality of vehicles within the traffic lane;

identify vehicle location through measuring differences between pixel intensity values along the line of pixels between the background frame and another digital image of the actual traffic lane with vehicles;

calculate a stopped delay for each vehicle; and calculate the average stopped delay per vehicle;

wherein calculating the stopped delay for each vehicle comprises monitoring a location of a front and rear of a vehicle between consecutive frames, calculating a speed and future position of the vehicle, determining the vehicle is stopped if the speed is below a specified stopping speed, calculating a total stopped delay for the vehicle over consecutive frames, determining if the vehicle becomes longer than an allowed vehicle length growth percentage when entering the intersection, and separating the rear of the vehicle from a front of a following vehicle such that the vehicle does not become longer than the allowed vehicle length growth percentage.

20. The computing device of claim 19, wherein calculating the average stopped delay per vehicle comprises:

calculating a total stopped delay of all vehicles; and dividing the total stopped delay by a total number of vehicles that entered the intersection.

21. A non-transitory computer-readable medium for estimating an average stopped delay per vehicle at a signalized intersection, the computer-readable medium comprising executable instructions for:

initializing background intensities of a line of pixels in a background frame comprising a digital image of an actual traffic lane without vehicles, wherein the line of pixels extends along a path that vehicles travel down the traffic lane and wherein the line of pixels has a length that is sufficient to extend along a length of a plurality of vehicles within the traffic lane;

identifying vehicle location through measuring differences between pixel intensity values along the line of pixels between the background frame and another digital image of the actual traffic lane with vehicles;

calculating a stopped delay for each vehicle; and calculating the average stopped delay per vehicle;

wherein calculating the stopped delay for each vehicle comprises monitoring a location of a front and rear of a vehicle between consecutive frames, calculating a speed and future position of the vehicle, determining whether the vehicle overlaps another vehicle, maintaining a division between the vehicles through a ratio of vehicle lengths before the vehicles were viewed as overlapping, determining the vehicle is stopped if the speed is below a specified stopping speed, and calculating a total stopped delay for the vehicle over consecutive frames.

22. The computer-readable medium of claim 21, wherein initializing background intensities comprises:

digitizing an image of the actual traffic lane without vehicles;

establishing the line of pixels on the digital image of the traffic lane without vehicles, such that the line of pixels extends upstream into the traffic lane;

assigning a length value to each pixel in the line of pixels; and reading and storing the intensities of each pixel in the line of pixels.

23. The computer-readable medium of claim 22, wherein identifying vehicle location comprises:

measuring the intensities of each pixel in the line of pixels on the digital image of the actual traffic lane with vehicles;

calculating the difference between the pixel intensities of the line of pixels on the digital image of the traffic lane without vehicles and the pixel intensities of the line of pixels on the digital image of the traffic lane with vehicles; and identifying a group of consecutive pixels where the difference between pixel intensity is outside of a specified threshold.

24. The computer-readable medium of claim 21, wherein calculating the average stopped delay per vehicle comprises:

calculating a total stopped delay of all vehicles; and dividing the total stopped delay by a total number of vehicles that entered the intersection.

25. A non-transitory computer-readable medium for estimating an average stopped delay per vehicle at a signalized intersection, the computer-readable medium comprising executable instructions for:

initializing background intensities of a line of pixels in a background frame comprising a digital image of an actual traffic lane without vehicles, wherein the line of pixels extends along a path that vehicles travel down the traffic lane and wherein the line of pixels has a length that is sufficient to extend along a length of a plurality of vehicles within the traffic lane;

identifying vehicle location through measuring differences between pixel intensity values along the line of pixels between the background frame and another digital image of the actual traffic lane with vehicles;

calculating a stopped delay for each digital image with vehicles; and calculating the average stopped delay per vehicle;

wherein calculating the stopped delay for each digital image with vehicles comprises calculating a distance between vehicles on the digital image with vehicles, determining whether a vehicle is stopped if the distance between vehicles is below a specified gap distance, determining whether a length of the vehicle is greater than a specified maximum length, dividing the vehicle into multiple stopped vehicles based on a specified average vehicle length if the length of the vehicle is greater than the specified maximum length, adding together a total number of vehicles stopped in the digital image with vehicles, and multiplying the total number of vehicles stopped by a time interval between each digital image with vehicles.

26. The computer-readable medium of claim 25, wherein calculating the average stopped delay per vehicle comprises:

calculating a total stopped delay of all digital images with vehicles; and dividing the total stopped delay by a total number of vehicles that entered the intersection.

27. A non-transitory computer-readable medium for estimating an average stopped delay per vehicle at a signalized intersection, the computer-readable medium comprising executable instructions for:

initializing background intensities of a line of pixels in a background frame comprising a digital image of an actual traffic lane without vehicles, wherein the line of pixels extends along a path that vehicles travel down the traffic lane and wherein the line of pixels has a length that is sufficient to extend along a length of a plurality of vehicles within the traffic lane;

identifying vehicle location through measuring differences between pixel intensity values along the line of pixels between the background frame and another digital image of the actual traffic lane with vehicles;

calculating a stopped delay for each digital image with vehicles; and calculating the average stopped delay per vehicle;

wherein calculating the stopped delay for each digital image with vehicles comprises calculating a distance between vehicles on the digital image with vehicles, determining whether a vehicle is stopped if the distance between vehicles is below a specified gap distance, identifying a vehicle with a length greater than a specified maximum length, determining a number and length of vehicles in a previous frame in a substantially similar location as the vehicle with the length greater than the specified maximum length, dividing the vehicle with the length greater than the specified maximum length into multiple stopped vehicles based on the number and length of vehicles in the previous frame in the substantially similar location, adding together a total number of vehicles stopped in the digital image with vehicles, and multiplying the total number of vehicles stopped by a time interval between each digital image with vehicles.

28. The computer-readable medium of claim 27, wherein calculating the average stopped delay per vehicle comprises:

calculating a total stopped delay of all digital images with vehicles; and dividing the total stopped delay by a total number of vehicles that entered the intersection.

29. A non-transitory computer-readable medium for estimating an average stopped delay per vehicle at a signalized intersection, the computer-readable medium comprising executable instructions for:

initializing background intensities of a line of pixels in a background frame comprising a digital image of an actual traffic lane without vehicles, wherein the line of pixels extends along a path that vehicles travel down the traffic lane and wherein the line of pixels has a length that is sufficient to extend along a length of a plurality of vehicles within the traffic lane;

identifying vehicle location through measuring differences between pixel intensity values along the line of pixels between the background frame and another digital image of the actual traffic lane with vehicles;

calculating a stopped delay for each vehicle; and calculating the average stopped delay per vehicle;

wherein calculating the stopped delay for each vehicle comprises monitoring a location of a front and rear of a vehicle between consecutive frames, calculating a speed and future position of the vehicle, determining the vehicle is stopped if the speed is below a specified stopping speed, calculating a total stopped delay for the vehicle over consecutive frames, determining if the vehicle becomes longer than an allowed vehicle length growth percentage when entering the intersection, and separating the rear of the vehicle from a front of a following vehicle such that the vehicle does not become longer than the allowed vehicle length growth percentage.

30. The computer-readable medium of claim 29, wherein calculating the average stopped delay per vehicle comprises:

calculating a total stopped delay of all vehicles; and dividing the total stopped delay by a total number of vehicles that entered the intersection.

* * * * *